Figure 1:
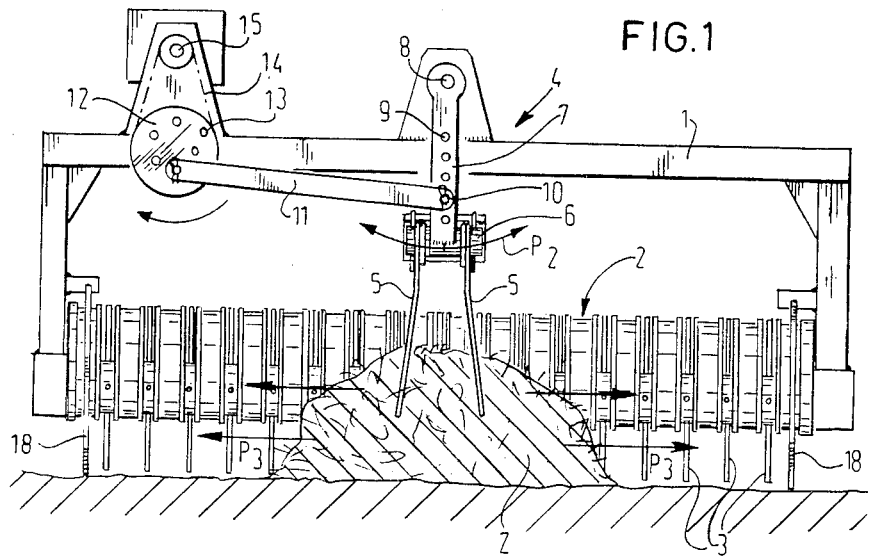

United States Patent [19]

Vissers et al.

[11] Patent Number: 4,565,057
[45] Date of Patent: Jan. 21, 1986

[54] DEVICE FOR PICKING UP CROP FROM THE FIELD

[75] Inventors: Hermanus H. Vissers, Nieuw-Vennep; Jan Wondergem, Rijsenhout, both of Netherlands

[73] Assignee: Multinorm B.V., Nieuw-Vennep, Netherlands

[21] Appl. No.: 524,700

[22] Filed: Aug. 22, 1983

Related U.S. Application Data

[63] Continuation of Ser. No. 276,046, Jun. 22, 1981, abandoned.

[30] Foreign Application Priority Data

Jul. 1, 1980 [NL] Netherlands ............ 8003794

[51] Int. Cl.$^4$ ............................................ A01D 78/04
[52] U.S. Cl. ...................................... 56/364; 56/14.4; 56/372
[58] Field of Search ............. 56/364, 372, DIG. 5, 56/DIG. 10, 13.9, 14.4, 192, 376; 198/519; 130/DIG. 1

[56] References Cited

U.S. PATENT DOCUMENTS

| 785,398 | 3/1905 | Bort | 130/DIG. 1 |
| 2,729,048 | 1/1956 | Dort | 56/364 |
| 3,191,372 | 6/1965 | Shepley | 56/364 |
| 3,696,598 | 10/1972 | Weichel | 56/192 |
| 3,984,969 | 10/1976 | Yatcilla | 56/364 |
| 4,330,982 | 5/1982 | Vissers et al. | 56/192 |

FOREIGN PATENT DOCUMENTS

| 1224978 | 9/1966 | Fed. Rep. of Germany | 56/192 |
| 2211173 | 8/1974 | France . | |

Primary Examiner—Gene Mancene
Assistant Examiner—David I. Tarnoff
Attorney, Agent, or Firm—John P. Snyder

[57] ABSTRACT

A driven transverse spreader forcibly spreads a windrow to be uniformly distributed in front of a crop pick-up device. Flexible aprons at the sides of the device prevent transverse spreading beyond the grasp of the pick-up device.

12 Claims, 6 Drawing Figures

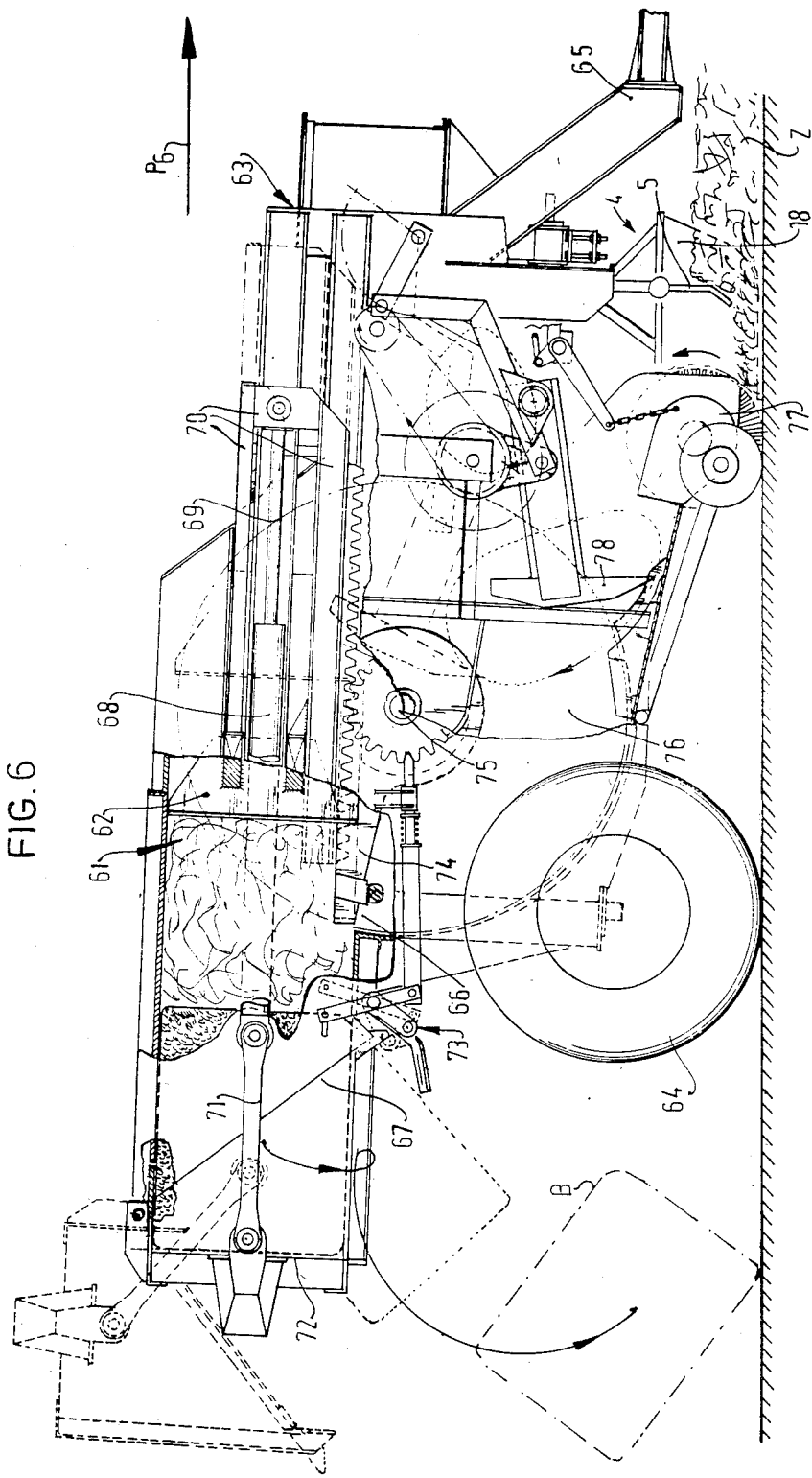

DEVICE FOR PICKING UP CROP FROM THE FIELD

This application is a continuation of application Ser. No. 276,046, filed June 22, 1981, now abandoned.

The invention relates to a device for picking up crop swaths of crop mainly comprising a frame movable across the field and crop harvesting means carried by said frame.

Such a device is frequently used in combination with a crop treating implement, for example, a press for making bales or bundles. With this kind of crop treating devices it is important for the feeding stream or the width of the implement to be as uniform as possible in order to avoid density differences in the stream of crop or in the final product i.e. the bale and to ensure effective operation of the pick-up means.

The invention has for its object to provide a device by which a uniform feed into the implement is ensured and which is distinguished in that in front of the crop picking up means, with respect to the direction of movement, there is arranged a driven member for spreading the crop in a transverse direction.

In one embodiment the spreading member may be constructed in the form of one or more downwardly directed tines, which are adapted to reciprocate in a transverse direction.

In a further embodiment the spreading member may be rotatable about a transverse axis, said member being provided with crop engaging elements arranged along a helical line. Thanks to this helical disposition the crop is laterally displaced.

The above mentioned and further features of the invention will be described more fully hereinafter with reference to a few embodiments.

Figure 2:
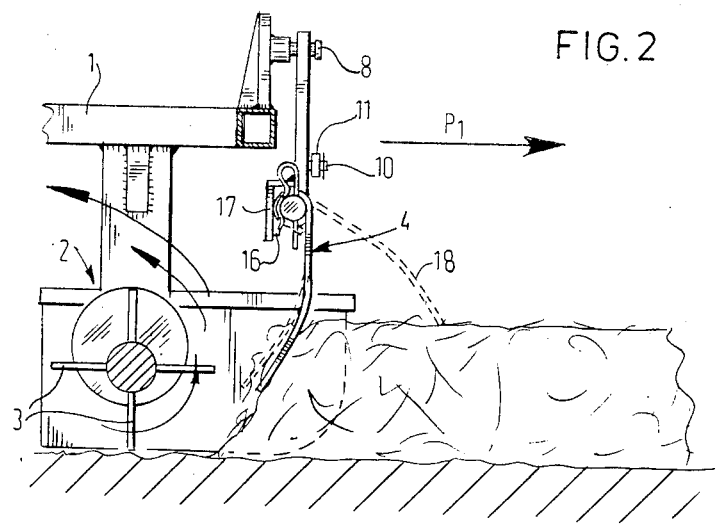

The drawing shows in:

FIG. 1 a front view of the device in accordance with the invention in a first embodiment, FIG. 2 is a side elevation of the device of FIG. 1

Figure 3:
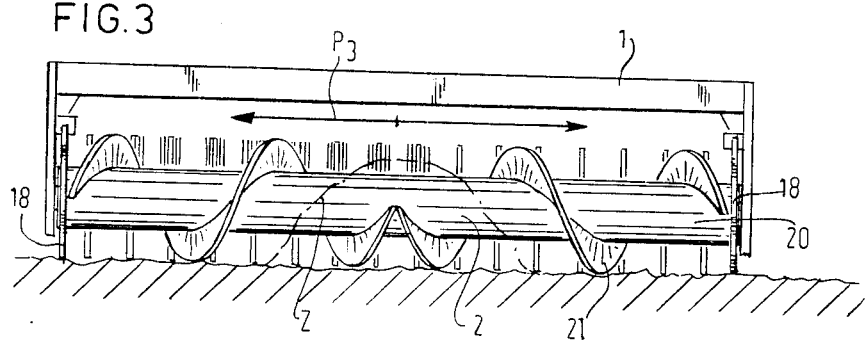
Figure 4:
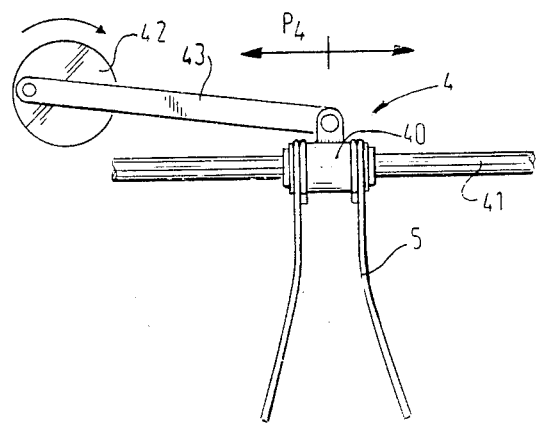
Figure 5:
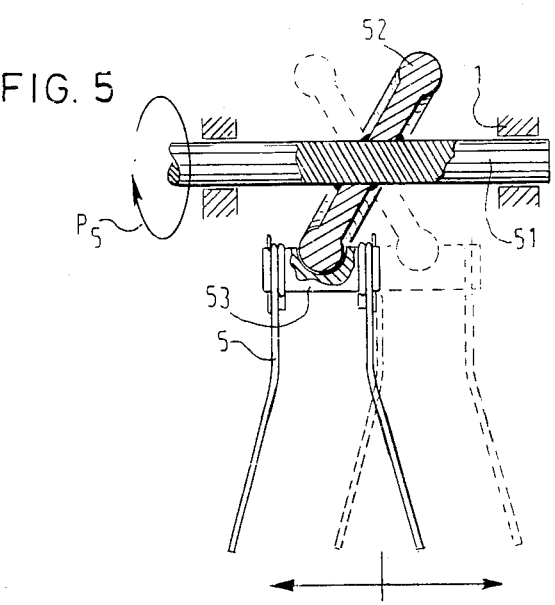

FIG. 3 a second embodiment of the device in accordance with the invention,

FIGS. 4 and 5 two alternative possibilities of driving a group of tines in the device of FIG. 1, FIG. 6 a cropbaler comprising a device embodying the invention.

The device shown in FIGS. 1 and 2 mainly comprises a frame 1, in which a pick-up implement 2 provided with rotatably driven tines 3 is arranged. The frame 1 is movable in the direction of the arrow P 1 in FIG. 2 across the field. At the front of the pick-up implement is arranged a spreading member 4 in the form of two downwardly directed tines 5, which are pivotally suspended by their top ends to a horizontal pin 6. The pin 6 is fastened to the lower end of a swinging arm 7, which is adapted to turn at 8 about a pin secured to the frame 1. The swinging arm 7 has holes 9 each adapted to receive a pin 10 for coupling a connecting rod 11. The other end of the connecting rod 11 is secured in a rotatable disc 12 also having holes 13 spaced apart from the centre by relatively different distances. The disc 12 is caused to rotate by means of a rope 14 by the driving shaft 15, which extends in the direction of movement P 1.

The tines 5 of the spreading member 4 occupy a trailing position with respect to the direction of movement P1 (see FIG. 2), said tines being capable of slightly yielding in a resilient manner from the position indicated in FIG. 2 by solid lines to the rear, though they cannot turn further to the rear, since a stop 16 secured to the tines engages a stop plate 17 of the swinging arm 7.

This construction, however, permits the tines 5 to turn forwardly, for example, as far as into the position indicated by the broken line T1 in FIG. 2. When the device moves backwards, damage of the spreading member is thus avoided.

The device depicted above operates as follows:

During the advance of the device in the direction of the arrow P 1 the driving mechanism 13, 14, 15 will move the swinging arm 7 in the direction of the arrow P 2 in reciprocatory manner, as a result of which the tines perform a swinging motion transversely of the direction of movement P1. At the approach of a swath Z, forming an accumulation of crop in front of the pick-up implement 2, the tines will spread part of the crop in the direction of the arrows P 3 up to the side aprons 18, for example, of rubber arranged on each side of the spreading member 4 in the frame 1. In this way the crop is uniformly spread through the width of the pick-up implement.

FIG. 3 shows an alternative embodiment of the spreading member 4, which consists in this case of a driven roller 20 rotatably suspended in the frame 1 and provided with crop-engaging or crop-spreading means 21 in the form of a worm. Although the means are shown here in the form of a continual, helical wall, this wall may, of course, be replaced by tine-like members. Obviously, by turning the roller 20 in the correct direction the crop of the swatch Z is spread to both sides in the direction of the arrow P 3. Also in this embodiment flexible aprons 18 are fastened on both sides to the frame. The pick-up implement 2 may be of the same construction as in the preceding embodiment.

FIG. 4 shows a spreading member 4, the downwardly directed tines 5 of which are fastened to a sleeve 40, which is reciprocatorily slidable in the direction of the arrow P 4 on a rod 41 fixed in the frame. The reciprocatory movement can be produced by a rotating disc, the rotary axis of which extends in the direction of movement P 4. A coupling rod 43 between a point of the disc 42 and a coupling point of the sleeve 40 brings about the conversion of the rotary movement of the disc 42 into the reciprocatory movement of the sleeve 40 i.e. of the tines 5.

FIG. 5 shows an embodiment in which a shaft 51 is rotatably journalled in the frame 1 and is rotated in the direction of the arrow P 5. To the shaft 51 is rigidly secured at an angle a disc 52, which can swing by the rotation of the shaft 51 from the position indicated by solid lines into the position indicated by broken lines. The periphery of the disc 52 co-operates with a groove-like recess in a holder 53, to which the tines 5 of the spreading member are secured. By means of a guide (not shown) for the sleeve 53 the swinging movement of the disc 52 will cause the sleeve 53 to reciprocate.

FIG. 6 illustrates an embodiment of a crop press provided with a spreading device according to the invention.

The press shown in FIG. 6 mainly comprises a horizontal baling chamber 61 holding a reciprocatorily driven ram 62. The baling chamber 61 is carried by a frame 63 having ground-engaging wheels 64 and a drawbar 65 by which the device can be hitched to a tractor or the like. The device is moved in the direction of the arrow P 6 by the tractor across the field.

The ram 62 is movable past a feeding opening 66 up to a dispenser opening 67 and for this purpose it is equipped with two driving mechanisms arranged one on each side of and beyond the baling chamber 61. Each driving mechanism comprises a hydraulic ram 68, the piston rod 69 of which is connected by its free end with a pressing body 70 connected with the ram 62. The pressing body 70 comprises two hollow beams extending one on each side of the rams 68 and being fastened to ears of the ram 62.

The ears of the ram 62 extend across slots in the sidewall of the baling chamber 61.

The end of the cylinder 68 remote from the piston rod 69 is connected through a coupling rod 71 with a pivot point of the upwardly pivotable rear wall 72 of the baling chamber 61.

The rear wall 72 can be locked in a closed pressing position by means of lock bolts 73.

The feeder opening 66 can be shut by means of a closing member or flap part 74. The flap part 74 can rotate through 360° about a shaft 75 extending transversely of the movement of the ram 62 and parallel to the plane of the feeder opening 66.

An auxiliary space 76 communicates with the feeder opening 66, the entrance of the auxiliary space 76, shown on the right-hand side in FIG. 6 being tangentially directed to the substantially circle-segment-shaped form of the auxiliary space.

The entrance is provided with a pick-up implement 77, for example, of the kind set forth above, which serves to pick up the crop from the ground and to pass it into the auxiliary space 76. Pushing members 78 advance the crop further into the auxiliary space 76. The pushing members 78 are moved along an elliptical path so that the lower ends of the pushing members 78 describe a closed path shown in the Figure.

At the front of the pick-up implement 77 is arranged a spreading member, for example, of the kind shown in FIG. 1. The downwardly directed tines 5 spread the crop of the swath Z uniformly in front of the pick-up implement 77 so that the crop will be passed uniformly distributed throughout the width via the auxiliary space 76 into the baling chamber 61. The crop in the bale formed in the baling chamber and indicated by the broken line B will, therefore, by uniformly densified.

The uniform distribution of the crop in front of the pick-up attachment permits this attachment, moreover, to operate with a high degree of efficiency so that the baler can be more rapidly moved across the field.

The invention is not limited to the embodiments described above. For example, the lateral members 18 may, of course, be constructed otherwise than in the form of the synthetic resin aprons.

Moreover, there may be arranged more than five tines side by side.

What is claimed is:

1. A device for picking up crop piled in windrows, comprising a frame movable across a field, means for picking up crops, said means being elongate to extend on either side beyond a windrow and carried by and extending transversely of said frame with respect to the direction of movement thereof, and a driven means disposed in front of said means for picking up crops at a height above and out of contact with the ground for knocking down a windrow and spreading the crop in such windrow in a transverse direction substantially parallel to and in uniform distribution across the width of said means for picking up crops, said driven means travelling back and forth along a transverse path parallel to said means for picking up crops.

2. A device as defined in claim 1 including crop retaining means disposed at each end of said means for picking up crop and extending forwardly thereof for providing stop surfaces to prevent crops from being spread beyond the ends of said means for picking up crops.

3. A device as claimed in claim 1 wherein said driven means comprises at least one downwardly directed tine.

4. A device as claimed in claim 3 wherein said tine is adapted to swing out of the downwardly directed position forwardly and upwardly.

5. A device as claimed in claim 3 wherein each tine includes a lower portion disposed in a trailing position.

6. A device as claimed in claim 4 wherein each tine includes a lower portion disposed in a trailing position.

7. A device for picking up crop piled in windrows, comprising a frame movable across a field, means for picking up crops, said means being elongate to extend on either side beyond a windrow and carried by and extending transversely of said frame with respect to the direction of movement thereof, and a driven means disposed in front of said means for picking up crops at a height above and out of contact with the ground for knocking down a windrow and spreading the crop in such windrow in a transverse direction substantially parallel to and in uniform distribution across the width of said means for picking up crops, said driven means being adapted to reciprocate transversely of said direction of movement.

8. A device as claimed in claim 7 wherein said driven means comprises at least one downwardly directed tine.

9. A device as claimed in claim 8 wherein said tine is adapted to swing out of the downwardly directed position forwardly and upwardly.

10. A device as claimed in claim 9 wherein each tine includes a lower portion disposed in a trailing position.

11. A device as claimed in claim 7 including crop retaining elements arranged on the frame on both sides of the means for picking up crops.

12. A device as claimed in claim 11 wherein the crop retaining elements are formed by flexible aprons.

* * * * *